United States Patent
Clark

[11] Patent Number: 6,160,497
[45] Date of Patent: Dec. 12, 2000

[54] VISUAL DISPLAY OF AIRCRAFT DATA LINK INFORMATION

[75] Inventor: Larry Clark, Phoenix, Ariz.

[73] Assignee: Honeywell International Inc., Morristown, N.J.

[21] Appl. No.: 09/223,085

[22] Filed: Dec. 29, 1998

[51] Int. Cl.[7] .................................................. G08G 5/04
[52] U.S. Cl. .......................... 340/961; 340/945; 701/3; 701/14; 701/120; 701/301; 342/29; 342/36
[58] Field of Search .................................. 340/961, 945; 701/9, 14, 120, 301, 3; 342/29, 36, 455; 709/100, 106

[56] References Cited

U.S. PATENT DOCUMENTS

| | | | |
|---|---|---|---|
| 4,835,537 | 5/1989 | Manion | 342/30 |
| 5,111,400 | 5/1992 | Yoder | 701/3 |
| 5,714,948 | 2/1998 | Farmakis et al. | 340/961 |
| 5,742,508 | 4/1998 | Kusui et al. | 703/120 |

*Primary Examiner*—Benjamin C. Lee

[57] ABSTRACT

A display and methodology visually rendering digital data link communications between aircraft and other aircraft or ground stations. The display may be a TCAS type aircraft display residing in the aircraft cockpit visually displaying the digital data link communications. The display may also be used at a ground location, such as at an air traffic control (ATC) center. Visually displaying the digital data link communications allows a pilot to obtain situational awareness by monitoring the digital communications between aircraft, and may be used in combination with or replace monitoring the voice communications being exchanged over the voice channels. In one embodiment, conversation balloons are associated with aircraft symbology on the display. In another embodiment, messages are arranged in the timeline that can be viewed live, or retrieved via the historical representation of previous messages. A scroll bar is provided as a cursor control device to select messages for display. A searching tool is also provided to search messages based upon selected characteristics, such as on content, text, proximity to a current aircraft etc.

35 Claims, 3 Drawing Sheets

VISUAL DISPLAY OF AIRCRAFT DATA LINK INFORMATION

FIELD OF THE INVENTION

The present invention is generally related to communications between aircraft and other aircraft and air traffic control ground stations, and more particularly to aircraft cockpit displays and ground station control displays.

BACKGROUND OF THE INVENTION

In commercial aviation today, a majority of the communications between an aircraft and a ground station, such as an air traffic control (ATC) tower, as well as between other aircraft, is verbally exchanged over a radio frequency (RF) voice communication channel. Air traffic is continuing to increase wherein several hundred aircraft are airborne at any one time in defined geographic regions. Thus, the number of communications between an ATC and an aircraft, and between multiple aircraft, is increasing as well. This increased traffic is making it increasing more difficult for pilots to maintain situational awareness in relation to other airborne aircraft during flight.

In the past, pilots of aircraft were able to generate a mental picture of other aircraft positions and their flight situation based upon listening to the verbal communications between the other aircraft and the air traffic control or other stations on a given frequency. The pilot could hear the ATC control tower clear the aircraft ahead to turn or change altitude, and thus the pilot could expect a similar clearance for his aircraft in a short time. The pilot could also hear other aircraft ask the ATC for permission to climb to higher altitudes, or different routing due to turbulence or weather ahead of his aircraft. All this monitored voice communication provided the pilot with a situational awareness of what other aircraft were doing, and what flight conditions they were experiencing.

With the advent of digital data link communications between aircraft, and between aircraft and the ATC or other ground stations, the pilots no longer have the ability to create an adequate mental picture of aircraft and their situations in the surrounding air space. Consequently, the pilot is no longer receiving the necessary information permitting him to understand what other aircraft are being cleared to do, and what conditions they are operating in by simply monitoring the voice communications on a given frequency.

There is desired an improved communication system providing the pilot the ability to monitor and comprehend communications being exchanged over digital data links.

SUMMARY OF THE INVENTION

The present invention achieves technical advantages as a display system suitable for use in an aircraft or at a ground control station, such as a ATC, providing a visual display of digital data link communications between aircraft, and between an aircraft and an ATC or other ground stations. This display system provides the pilot or ground station personnel the ability to understand what other aircraft are being cleared to do, and what conditions they are operating in, when data is being exchanged over the digital data links. Existing aircraft cockpit electronics displays in the cockpit, such as TCAS displays, can be modified to incorporate the improvement of the present invention to visually display the digital data links communications.

In one display format, conversation balloons are added to aircraft symbology in the vicinity of the aircraft that clearly indicates the data being sent between the aircraft to the ground station, or between aircraft. A time stamp is provided with the conversation balloon that shows the elapsed time since the data message was generated. This allows the pilot to quickly tell how old the message is in minutes and seconds. Through a selection menu the pilot can selectively establish a time limit for messages, so that the messages are removed from the screen after a set time, for example 2 minutes. A box in the lower right corner displays the data messages sent from the ground ATC facility that are addressed to the aircraft in the immediate vicinity of the aircraft. Each message also has a time stamp and the messages are sequentially arranged in time with the oldest data message at the bottom, with the newest message appearing at the top of the box.

According to a second message display format, the messages are arranged along a timeline that the pilot can view live, or go back and research for information. Using a cursor control device, the pilot can move the scroll bar at the bottom of the display to selectively move from a live display of new messages appearing from right to left, to a historical display of messages sent over the past few minutes and up to an hour or more. The message source or sender identification is shown along the left side of the display with the message content shown along the timeline to the right. Private messages between aircraft and the addressee are shown, but without the content or text displayed. Color codes provide the pilot with message importance, such as with a red message being very high importance or emergency, amber or yellow used for normal importance, and green being used for low importance or routine messages. A time indication is provided along the bottom edge of the display that provides an elapsed time indication as to how old the message is, as they scroll off the left side, and new messages appear on the right side. A search tool is provided to permit the pilot to search for a specific message relative to a certain aircraft identification, time or subject including key word or words.

DETAILED DESCRIPTION OF THE PREFERRED EMBODIMENT

Figure 1:
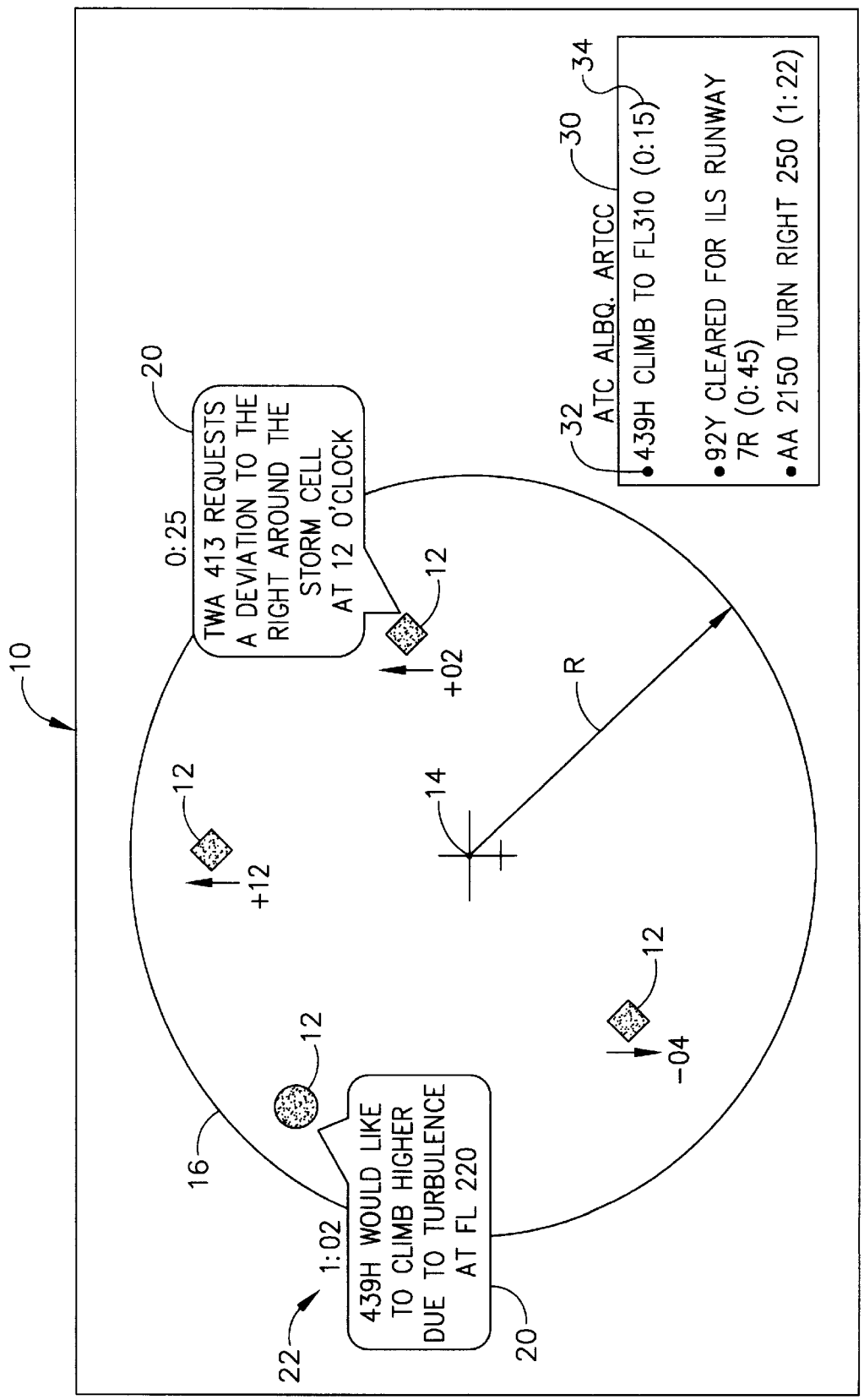
FIG. 1 illustrates a TCAS display displaying aircraft traffic in the vicinity of an aircraft with additional conversation balloons visually depicting digital data link communications between the aircraft and other aircraft, an ATC or other ground stations.

Referring now to FIG. 1, there is generally depicted at 10 a TCAS display according to the present invention suitable for use in an aircraft cockpit that visually renders the aircraft traffic in the vicinity of the aircraft outfitted with display 10 (not shown). Typical symbology, as depicted, represents aircraft as generally shown at 12 with the relative position of the outfitted aircraft being represented in the center of the display at 14 within range ring 16. The range ring 16 is scaled such that the geographical relationship between the aircraft 14 and the proximate aircraft 12 is ascertainable. The radius of the range ring 16 visually rendering the symbology indicative of the aircraft is depicted at R, and can be selected by the pilot as desired. A typical radius R may be about 100 nautical miles, but can be selectively determined by the pilot. The discussion of the TCAS display discussed so far is well known in the prior art.

According to a first preferred embodiment of the present invention, the TCAS display 10 is further provided with mechanisms providing conversation balloons generally shown at 20 associated with each of the associated aircraft targets 12. These conversation balloons 20 visually depict the content of the data messages exchanged over a digital data link sent from that associated aircraft 12 to a ground station, such as an ATC, or to another aircraft. Just above each conversation balloon 20 is an associated time stamp 22 that shows the elapsed time since the data message was sent by the associated aircraft 12. Alternatively, the time stamp may be generated to indicate the elapsed time since the message was received by aircraft 14. This time stamp allows the pilot of the aircraft 14 to quickly ascertain how old the message is in minutes and seconds. Through a selection menu the pilot can establish a time limit for the messages 20 that are displayed in range ring 16 for the aircraft 12 within the range shown at R so that the messages 20 are removed from the screen after this predetermined set time, for example two minutes.

At the lower right portion of display 10 is seen a summary box 30 that visually displays the most recent data messages sent from the nearby ATC, identified as Albuquerque in this example, that are addressed to the aircraft 12 in the immediate vicinity indicated in range ring 16 of the aircraft 14. Each message shown at 32 has an associated time stamp 34, whereby the messages 32 are sequentially arranged in time with the oldest data message at the bottom of the list, with the newest message appearing at the top of the box.

The first preferred embodiment of the present invention has technical advantages as a TCAS display whereby the pilot can quickly and easily ascertain the content of digital data messages exchanged over the digital data link between other aircraft 12, as well as between other aircraft 12 and an ATC or other ground stations. This visual rendition of the digital message traffic is used by a pilot to supplement or replace monitoring the voice communications on the voice channels, providing situational awareness with regards to other nearby aircraft.

Figure 2:
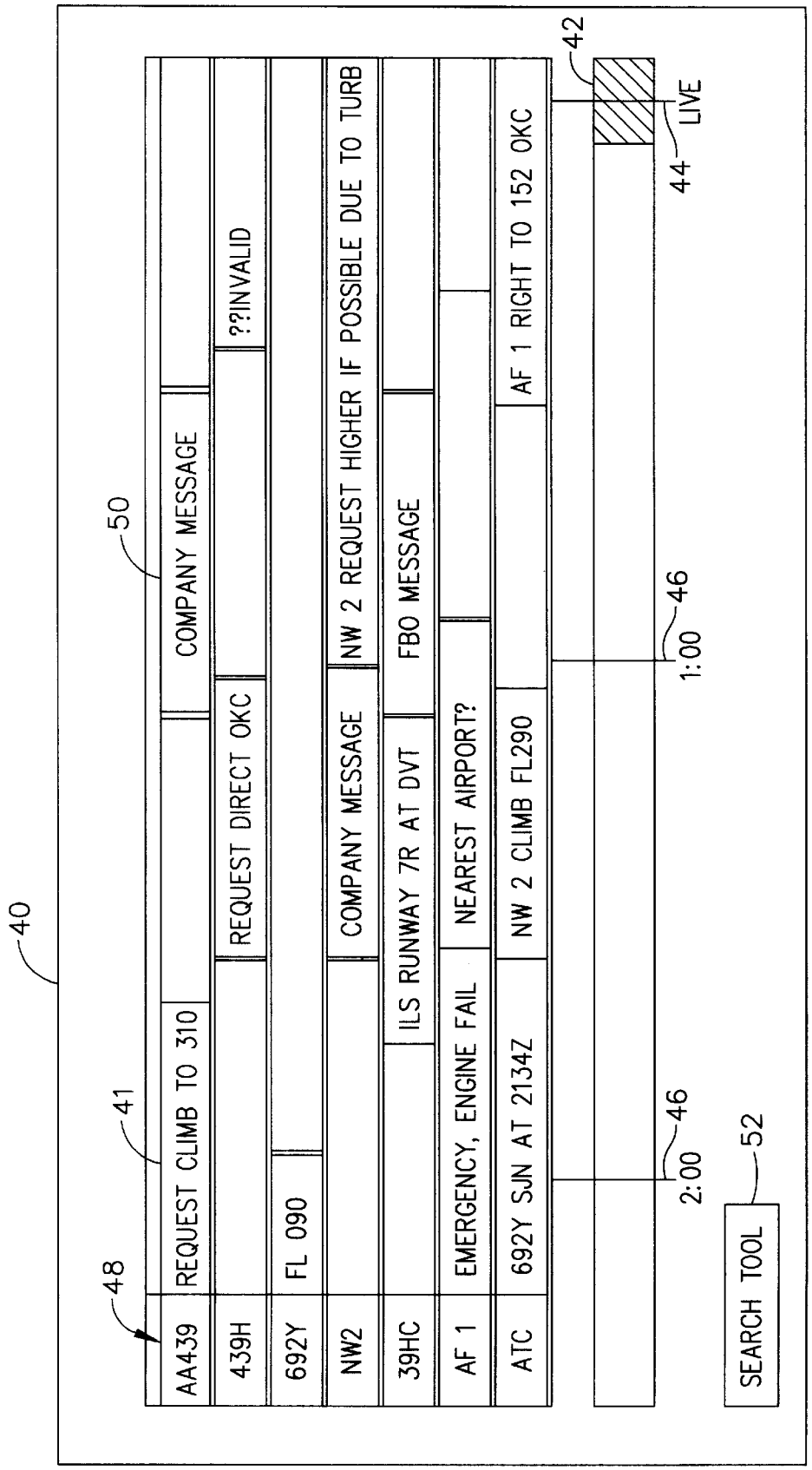
FIG. 2 illustrates a display visually depicting the digital data link messages arranged along a timeline that the pilot can view live, or go back and research for information using a cursor control device.

Referring now to FIG. 2, there is illustrated a second preferred embodiment of the present invention whereby a display 40 visually renders the digital data messages 41 exchanged over the digital data communications link in a format arranged along a timeline. Using this timeline format, the pilot can view messages 41 live, or go back and review previously sent messages using a cursor control/scroll bar feature shown at 42. The pilot can selectively move the scroll bar 42 along the bottom of the display from a live time reference, shown at 44, whereby messages 41 appear in time right to left, to a historical display of messages generated over the past few minutes indicated by the time lapse references shown at 46. The message source or sender is depicted at 48 along the left side of the display 40, with the message content associated with the sender being shown to the right along the timeline. Private messages between the aircraft and an addressee are shown, but without the content or text displayed such as shown at 50. Identifiers such as color codes of messages provide the pilot with message importance. For instance, a message depicted in red indicates a very high importance or emergency, amber or yellow is used for normal importance, and the green message is depicted to indicate a low importance or routine message.

The time reference indicators 46 shown along the bottom edge of the display 40 provide the elapsed time indication indicating how old the associated messages are, as they scroll off the left side of the display, and new messages appear from the right side.

A search tool is depicted at 52 that permits the pilot to search for a specific message relative to a certain aircraft identification, time, location, altitude, or subject including key word or words. For instance, the pilot can use the search tool 52 to screen or search messages relating to "turbulence", or for messages sent within the last 30 seconds. The search tool 52 is truly versatile to allow the pilot to customize his search for messages as they pertain to a desired subject matter or parameter. Observing all the digital data messages exchanged over the digital data link between aircraft, and between the aircraft and the ATC or other ground stations, allows the pilot to obtain situational awareness by understanding what other aircraft are being cleared to do, what conditions they are operating in, and what data is being exchanged between the other aircraft.

Figure 3:
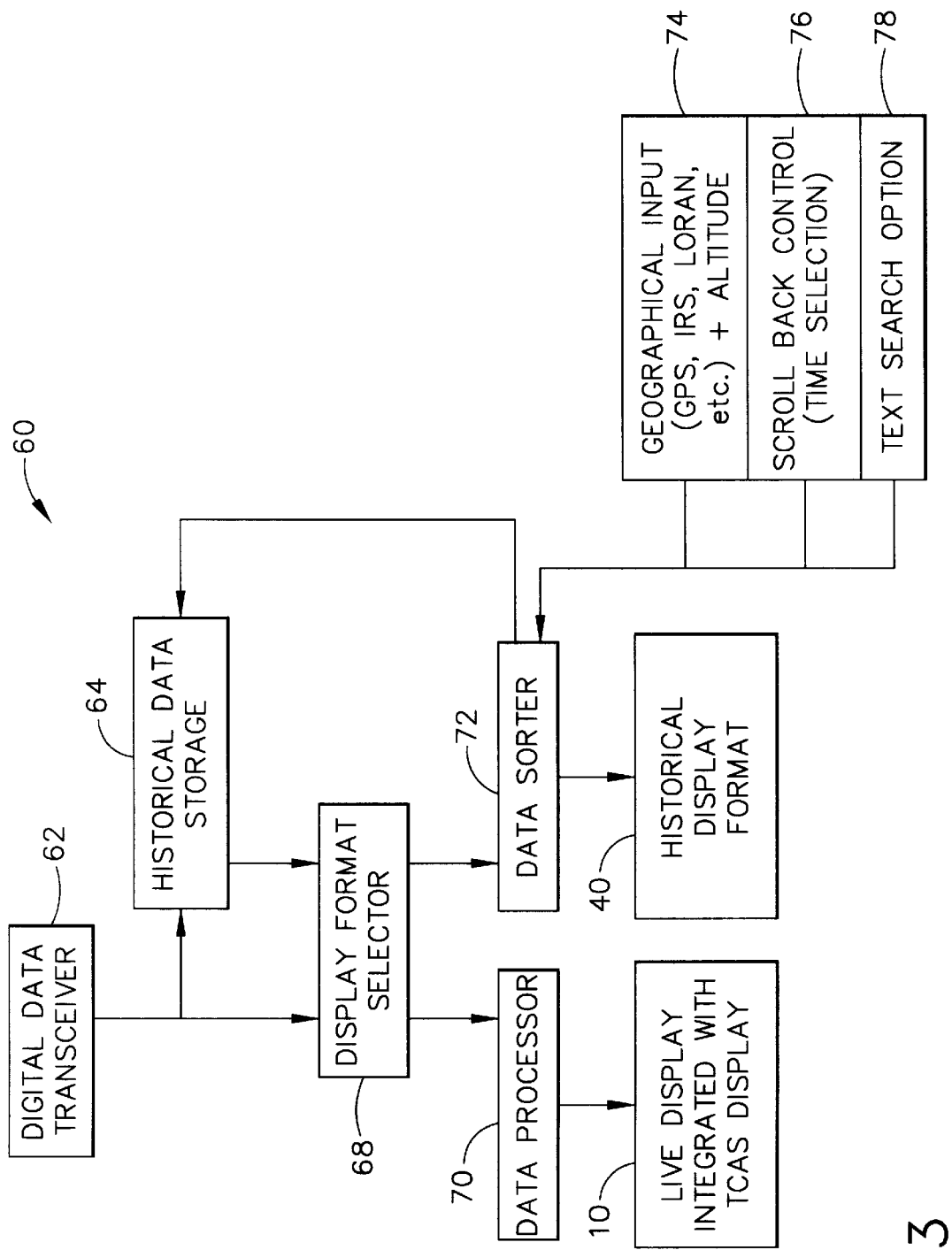
FIG. 3 is a functional block diagram of a system according to the present invention for use in an aircraft, and which can be used at a ATC control tower or ground station.

Referring now to FIG. 3, there is generally shown at 60 a block diagram of a functional block diagram corresponding to display 10 in FIG. 1 and display 40 in FIG. 2. Digital data messages sent over the digital data link are received via a digital data communication transceiver 62 from external sources, such as an ATC, other aircraft, and other ground stations. These received digital data messages are stored for later retrieval and playback in a historical data storage module 64 that may comprise both RAM and ROM or other suitable storage mediums. The data messages stored at storage module 64 are associated with a time stamp indicative of when the data message was received such that the data message can be related in time to other data messages from other sources. This data storage module 64 and associated time stamp allows the data messages to be displayed relative to time and to facilitate the method of scrolling through the data transmissions relative to time as shown in FIG. 2. The digital data messages may have associated parameters including geographic location, such as the latitude and longitude of the originator of the data, the altitude of the originator, and time of transmission to name a few. This allows the operator of the function 60 to sort and display data messages from other sources relative to the distance from the current location of the aircraft 14, as a function of the altitude of the aircraft, as a function of time etc. The storage module 64 also permits the operator to search the data messages and display messages which contain key words or subjects.

The digital data messages are also provided by transceiver 62 to a display format selector 68 which contains suitable processing means such as a microprocessor, digital signal processor (DSP) or other suitable processing device. The display format selector 68 that data messages are only shown for those aircraft targets that are depicted in range ring 16 on the TCAS display. The data processing of selector 68 also identifies the geographic position associated with the sender of each data message and relates that message to the correct target 12 on the TCAS display, based upon the known current location of the associated aircraft 14, and the calculated bearing and distance to each TCAS target. Altitude information provided as a parameter within the data message can also be used to confirm that the correct TCAS target 12 on the cockpit display has been given the correct message text for display. The processing further insures that the conversation balloon 20, or text box, is located around the associated target 12 in the optimal location so that it will not overwrite other text, and will not cover other targets 12 on the display.

A data processor 70 and a data sorter 72 control the display format of the digital data when displayed in a live format, such as in FIG. 1, or in the combination of live and historical data format shown in FIG. 2.

Data sorter 72 receives data from multiple sources including a geographic input device shown at 74 providing geographic location which can be provided by locating devices such as GPS, IRS, Loran and altitude information of the associated aircraft 14, facilitating the data sorter 72 to sort the digital data messages relative to the current information of the aircraft 14. A scroll back control mechanism 76 provides control of the data sorter 72 to selectively establish the time reference for messages to be displayed, as shown in FIG. 2. For instance, the scroll indicator 42 can be rolled back to the left to reference 46 associated with one minute (1:00), corresponding to messages received one minute prior to the current time. A text search option input module 78 provides the search tool, selectable at 52 in FIG. 2, allowing the text to be sorted. The text search module 78 controls the data sorter 72 to provide for the selective display of digital messages at the instruction of the pilot.

For instance, the pilot may want to scroll back through received data messages to find a specific message from another aircraft that occurred five or ten minutes ago. Or, the pilot may want to only see data messages from other aircraft that are within ten nautical miles of his present position, and within 2,000 feet of his present altitude. The pilot can also sort the data messages for any that contain information about turbulence, or quality of ride reports from other aircraft ahead of him, or to find a message from a specific aircraft tail number or flight number.

The display of the present invention can be used at a ground location as well, such as at an air traffic control tower, wherein the display may be used with, or replace the ATC radar screen currently displaying aircraft targets. The present invention provides the ability to scroll back to messages in time, and filter messages based upon content, geographic location and altitude.

In summary, the display of present invention derives technical advantages as a method and apparatus displaying digital data messages being exchanged over the digital data communications link between aircraft and other aircraft or ground stations, thereby providing a pilot the ability to enhance his mental picture of the aircraft in surrounding airspace to providing increased situational awareness. The display of the present invention augments or replaces the monitoring of voice communications across RF voice communications channels, thereby allowing the pilot to mentally picture what other aircraft are doing and experiencing.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An aircraft display for use in an aircraft, comprising:
   a data reception module receiving data indicative of content of communications between a plurality of external sources; and
   a display coupled to said data reception module visually rendering said data such that the content of the communications is visually ascertainable;
   wherein said data comprises information regarding atmospheric conditions.

2. The display as specified in claim 1 wherein said data has an associated time parameter indicative of time the associated communication was sent.

3. The display as specified in claim 2 wherein the display visually renders said data as a function of the time parameter.

4. The display as specified in claim 3 wherein the display visually renders said data in relation to a current time.

5. The display as specified in claim 1 wherein said display visually renders a time stamp indicative of an elapsed time since the associated communication was received.

6. The display as specified in claim 1 wherein said data has an associated geographical location parameter indicative of a location of the external source.

7. The display as specified in claim 6 wherein said display visually renders said data as a function of the geographical location parameter.

8. The display as specified in claim 1 wherein said data has an associated altitude parameter indicative of an altitude of the external source.

9. The display as specified in claim 1 wherein said data has an associated geographical location parameter indicative of an identification of the external source.

10. The display as specified in claim 1 further comprising a data sort module coupled to the data reception module and the display sorting the data as a function of a common parameter for display on the display.

11. The display as specified in claim 1 further comprising selection means to selectively display said data on said display.

12. The display as specified in claim 11 wherein said selection means facilitates selectively displaying said data as a function of a distance of the external source from the aircraft.

13. The display as specified in claim 11 wherein said selection means facilitates selectively displaying said data as a function of an altitude of the external source from the aircraft.

14. The display as specified in claim 11 wherein said selection means facilitates selectively displaying said data as a function of time of the data was received from the external source.

15. The display as specified in claim 11 wherein said selection means facilitates selectively displaying said data as a function of time of the data was sent by the external source.

16. The display as specified in claim 1 wherein said data is rendered as a conversation balloon.

17. The display as specified in claim 1 wherein said data is rendered in a table as a function of time.

18. The display as specified in claim 1 wherein said data comprises digital data communicated to said data reception module over a digital data link.

19. An information display system installed in a moveable vehicle comprising in combination:
   a host vehicle wherein said vehicle is structured to carry and be substantially controlled by at least one human operator;
   a data reception module located in said host vehicle wherein said data reception module is electronic and said data reception module is configured to receive information by monitoring radio communications between a plurality of sources external to said host vehicle;
   a display module located in said host vehicle and connected to said data reception module wherein said display module visually renders said information for the observation of said human operator.

20. The system as specified in claim 19 wherein said radio communications have a primary purpose other than for use by the operator of said host vehicle.

21. The system as specified in claim 19 wherein said host vehicle is an aircraft.

22. The system as specified in claim 21 wherein said sources consist of other aircraft and at least one ground station, and said communications comprise messages selected from the group consisting of: requests, explanations of requests, orders, and explanations of orders.

23. The system as specified in claim 19 wherein said sources external to said host vehicle comprise a first source and a second source, and said information comprises at least one statement made by said first source specifically to said second source.

24. The system as specified in claim 23 wherein said information further comprises at least one statement made by said second source specifically to said first source.

25. The system as specified in claim 19 wherein said information comprises data regarding substantially current conditions in the area.

26. The system as specified in claim 25 wherein said information further comprises weather data.

27. The system as specified in claim 19 wherein said information is visually rendered geographically.

28. The system as specified in claim 27 wherein said information is visually rendered on said display module in the form of conversation balloons.

29. The system as specified in claim 19 wherein said information is visually rendered on a timeline.

30. The system as specified in claim 29 further comprising a scroll back feature.

31. The system as specified in claim 19 further comprising a search tool.

32. The system as specified in claim 19 further comprising a data sorter.

33. A method of improving the situational awareness of an aircraft pilot flying a host aircraft comprising the steps of:

monitoring radio communications between a plurality of aircraft wherein said radio communications comprise situational information including information regarding atmospheric conditions;

storing said situational information on a computer located on the host aircraft;

visually rendering said situational information in the cockpit of said host aircraft.

34. The method as specified in claim 33 further comprising the step of monitoring radio communications between a plurality of aircraft and at least one ground station wherein said radio communications comprise situational information including information regarding atmospheric conditions.

35. The method as specified in claim 33 wherein said radio communications comprise digital data communicated over a digital data link.

* * * * *